(12) United States Patent
Ota et al.

(10) Patent No.: US 6,719,538 B2
(45) Date of Patent: Apr. 13, 2004

(54) ROTATING APPARATUS

(75) Inventors: Masaki Ota, Kariya (JP); Masahiro Kawaguchi, Kariya (JP); Yasuharu Odachi, Kariya (JP); Masanori Sonobe, Kariya (JP); Taku Adaniya, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/095,877

(22) Filed: Mar. 11, 2002

(65) Prior Publication Data
US 2002/0131871 A1 Sep. 19, 2002

(30) Foreign Application Priority Data
Mar. 19, 2001 (JP) ......... 2001-079064

(51) Int. Cl.[7] ............ F04B 49/00; F04B 17/00
(52) U.S. Cl. ......... 417/223; 417/374; 417/362
(58) Field of Search ............ 417/223, 313, 417/319, 374, 410.1, 411, 222.1, 269, 222.2, 362; 310/59, 60 R, 254

(56) References Cited

U.S. PATENT DOCUMENTS

| | | | |
|---|---|---|---|
| 4,654,551 A | 3/1987 | Farr | 310/112 |
| 5,562,182 A | 10/1996 | Kayukawa et al. | 184/6.17 |
| 5,867,996 A * | 2/1999 | Takano et al. | 62/175 |
| 6,146,106 A * | 11/2000 | Suitou et al. | 417/222.2 |
| 6,247,899 B1 * | 6/2001 | Ban et al. | 417/16 |
| 6,375,436 B1 * | 4/2002 | Irie et al. | 417/223 |
| 2002/0053838 A1 * | 5/2002 | Okuda | 310/59 |

FOREIGN PATENT DOCUMENTS

| | | | |
|---|---|---|---|
| EP | 0 887 550 A1 | 12/1998 | ......... F04B/27/08 |
| JP | 6-87678 | 12/1994 | |
| JP | 8-14145 * | 1/1996 | |
| JP | 2001-020859 | 1/2001 | |

* cited by examiner

Primary Examiner—Justine R. Yu
Assistant Examiner—Michael K. Gray
(74) Attorney, Agent, or Firm—Morgan & Finnegan, LLP

(57) ABSTRACT

The present invention provides a rotating apparatus. The rotating apparatus includes a rotor and a motor generator. The rotor includes a belt holder on its outer circumferential surface. The belt holder transmits power between an engine and the rotor. The motor generator is accommodated in and operably connected to the rotor. The motor generator selectively functions as at least one of a motor and a generator. The motor generator is arranged inside the belt holder such that the motor generator is surrounded by the belt holder.

23 Claims, 4 Drawing Sheets

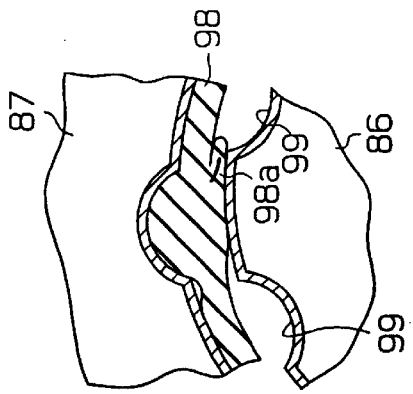
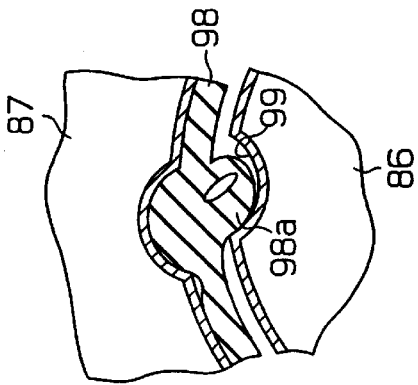
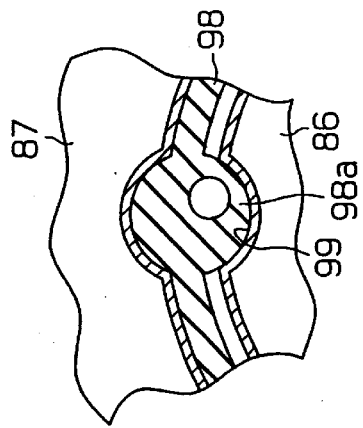
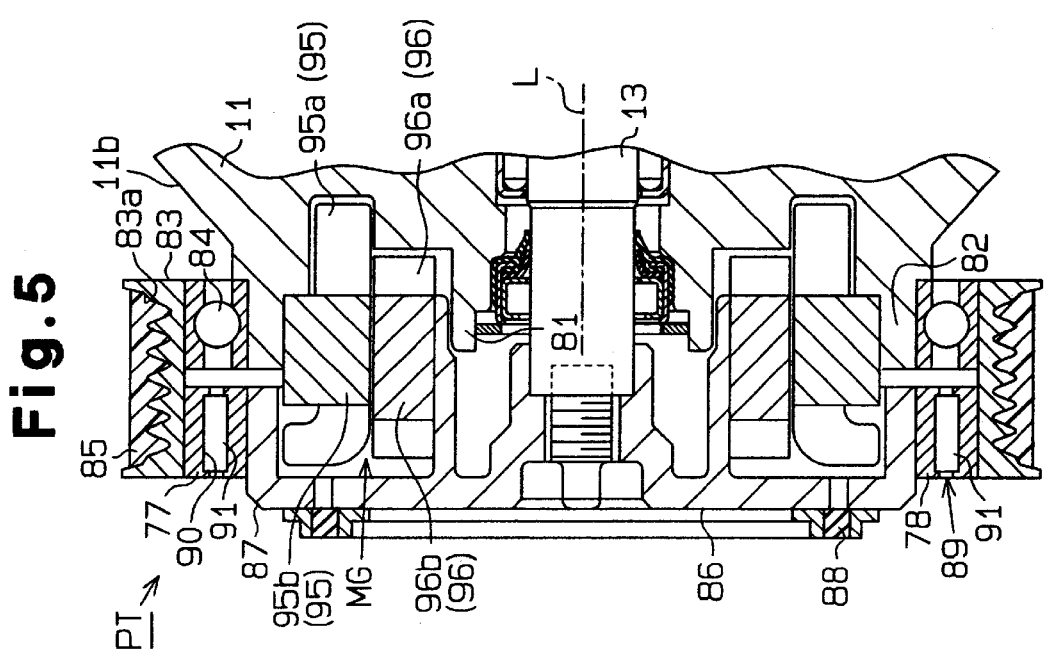

ROTATING APPARATUS

BACKGROUND OF THE INVENTION

The present invention refers to a rotating apparatus located in a compressor for a vehicular air conditioner. More specifically, the present invention pertains to a rotating apparatus for transmitting power to a compressor from a drive source of a vehicle, which is an engine.

A typical engine of a vehicle employs an idling stop system in these days to improve the fuel economy. The idling stop system automatically stops the idling engine when the vehicle is stopping such as when waiting at stoplights. Thus, a hybrid type compressor, such as the one disclosed in Japanese Laid-Open Utility Model Publication No. 6-87678, is used for a vehicular air conditioner so that the air-conditioner can be operated even when the engine is stopped.

In the hybrid type compressor of the above publication, a pulley is rotatably supported in a housing of a compressor. A belt holder is formed on the outer circumferential surface of the pulley. Power is transmitted to the pulley from an engine through the belt. An electric motor is located in the pulley and is connected to and driven by a drive shaft of the compressor. When the engine is stopped, the electric motor rotates the drive shaft of the compressor.

However, in the compressor of the above publication, a cylindrical portion extends from the side of the belt holder in the axial direction of the drive shaft. The electric motor is located in the cylinder portion. That is, the electric motor is accommodated in the pulley but the size of the pulley is increased by forming the cylindrical portion. Therefore, the size of the compressor, which includes such pulley, is increased in the axial direction of the drive shaft. As a result, it is difficult to install such compressor in a vehicle.

SUMMARY OF THE INVENTION

The objective of the present invention is to provide a rotating apparatus that is miniaturized in the axial direction.

To achieve the foregoing objective, the present invention provides a rotating apparatus. The rotating apparatus includes a rotating body and a rotary electric device. The rotating body includes a power transmitting portion on its outer circumferential surface. The power transmitting portion transmits power between an external drive source and the rotating body. The rotary electric device is accommodated in and operably connected to the rotating body. The rotary electric device selectively functions as at least one of a motor and a generator. The rotary electric device is arranged inside the power transmitting portion such that the rotary electric device is surrounded by the power transmitting portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is an enlarged cross-sectional view illustrating the vicinity of a pulley according to a further embodiment; and FIGS. 6(a), 6(b) and 6(c) show enlarged cross-sectional views illustrating operation steps of a torque limiter according to a further embodiment.

DETAILED DESCRIPTION OF THE PREFERRED EMBODIMENTS

A rotating apparatus according to a preferred embodiment of the present invention will now be described. The rotating apparatus is used for a pulley in a swash plate type variable displacement compressor of a vehicular air conditioner.

Figure 1:
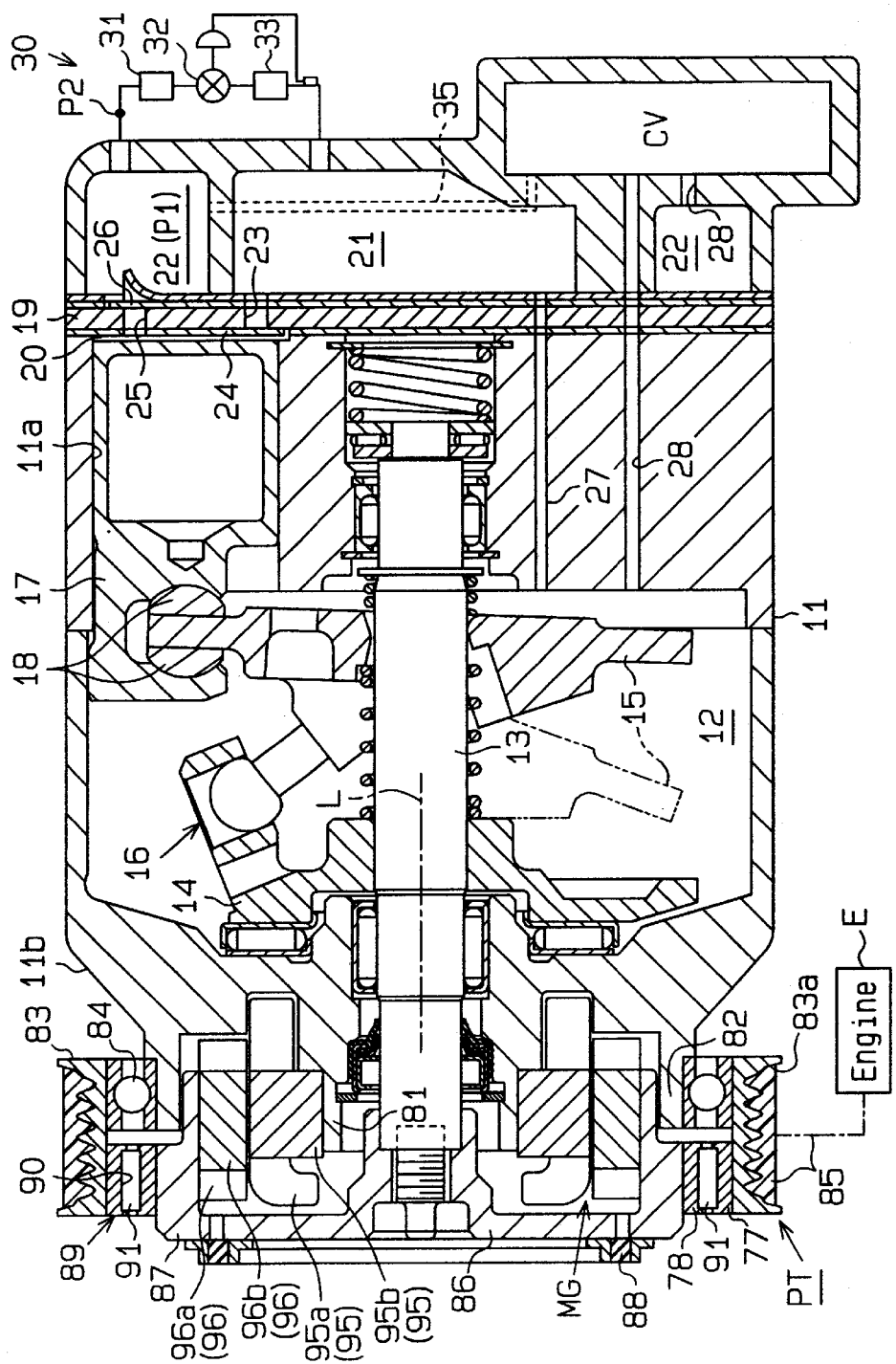
FIG. 1 is a cross-sectional view illustrating a swash plate type variable displacement compressor.

As shown in FIG. 1, a fluid machine, which is a swash-plate type variable displacement compressor in the preferred embodiment (hereinafter, simply referred to as a compressor), includes a housing 11. A control chamber, which is a crank chamber 12 in the preferred embodiment, is defined in the housing 11. A drive shaft 13 is rotatably supported in the crank chamber 12. The drive shaft 13 is connected to and driven by a drive source of a vehicle, or an engine E, through a rotating apparatus, which is a pulley PT in the preferred embodiment.

The pulley PT has a rotary electric device, which is a motor generator MG in the preferred embodiment. The motor generator MG is located in the power transmitting path between the engine E and the drive shaft 13 and functions as a motor and a generator. When the engine E is running, the pulley PT always transmits power from the engine E to the drive shaft 13 and the motor generator MG. That is, the pulley PT functions as a clutchless type power transmitting mechanism for the power transmission between the engine E and the compressor. If an air-conditioner is operated when the engine E is stopped, the motor generator MG functions as a motor. Thus, the pulley PT driven by the motor generator MG rotates the drive shaft 13.

A lug plate 14 is located in the crank chamber 12 and is secured to the drive shaft 13 to rotate integrally with the drive shaft 13. A swash plate 15 is located in the crank chamber 12. The swash plate 15 slides along the drive shaft 13 and inclines with respect to the axis of the drive shaft 13.

A hinge mechanism 16 is provided between the lug plate 14 and the swash plate 15. The hinge mechanism 16 causes the swash plate 15 to rotate integrally with the lug plate 14 and the drive shaft 13 and to incline with respect to the drive shaft 13.

Cylinder bores 11a (only one shown) are formed in the housing 11. A single headed piston 17 is reciprocally accommodated in each cylinder bore 11a. Each piston 17 is coupled to the peripheral portion of the swash plate 15 by a pair of shoes 18. Therefore, when the swash plate 15 rotates with the drive shaft 13, the shoes 18 convert the rotation of the swash plate 15 into reciprocation of the pistons 17.

A valve plate assembly 19 is located in the rear portion of the housing 11. A compression chamber 20 is defined in each cylinder bore 11a by the associated piston 17, the housing 11, and the valve plate assembly 19. The valve plate assembly 19 has suction ports 23, suction valve flaps 24, discharge ports 25 and discharge valve flaps 26. Each set of the suction port 23, the suction valve flap 24, the discharge port 25 and the discharge valve flap 26 corresponds to one of the cylinder bores 11a. A suction chamber 21 and a discharge chamber 22 are defined in the rear portion of the housing 11.

When each piston 17 moves from the top dead center to the bottom dead center, refrigerant gas in the suction chamber 21 is drawn into the corresponding compression chamber 20 through the associated suction port 23 and the suction valve flap 24. The refrigerant gas drawn into each compression chamber 20 is compressed to a predetermined pressure when the corresponding piston 17 moves from the bottom dead center to the top dead center. The compressed refrigerant gas is discharged to the discharge chamber 22 through the associated discharge port 25 and the discharge valve flap 26.

As shown in FIG. 1, a bleed passage 27 and a supply passage 28 are formed in the housing 11. The bleed passage 27 connects the crank chamber 12 with the suction chamber 21.

The supply passage 28 connects the discharge chamber 22 with the crank chamber 12. The supply passage 28 is regulated by a control valve CV.

The degree of opening of the control valve CV is changed for controlling the relationship between the flow rate of high-pressure gas flowing into the crank chamber 12 through the supply passage 28 and the flow rate of gas flowing out of the crank chamber 12 through the bleed passage 27. The crank chamber pressure is determined accordingly. In accordance with a change in the pressure in the crank chamber 12, the difference between the crank chamber pressure and the pressure in each compression chamber 20 is changed, which alters the inclination angle of the swash plate 15. As a result, the stroke of each piston 17, that is, the discharge displacement, is controlled.

For example, when the pressure in the crank chamber 12 is lowered, the inclination angle of the swash plate 15 is increased and the compressor displacement is increased accordingly. When the crank chamber pressure is raised, the inclination angle of the swash plate 15 is decreased and the compressor displacement is decreased accordingly.

As shown in FIG. 1, the refrigerant circuit (refrigeration cycle) of the vehicular air conditioner includes the compressor and an external refrigerant circuit 30. The external refrigerant circuit 30 includes a condenser 31, an expansion valve 32, and an evaporator 33.

A first pressure monitoring point P1 is located in the discharge chamber 22. A second pressure monitoring point P2 is located in the refrigerant passage at a part that is spaced downstream from the first pressure monitoring point P1 toward the condenser 31 by a predetermined distance. The first pressure monitoring point P1 is connected to the control valve CV through a first pressure introduction passage 35. The second pressure monitoring point P2 is connected to the control valve CV through a second pressure introduction passage 36 (see FIG. 4).

Figure 4:
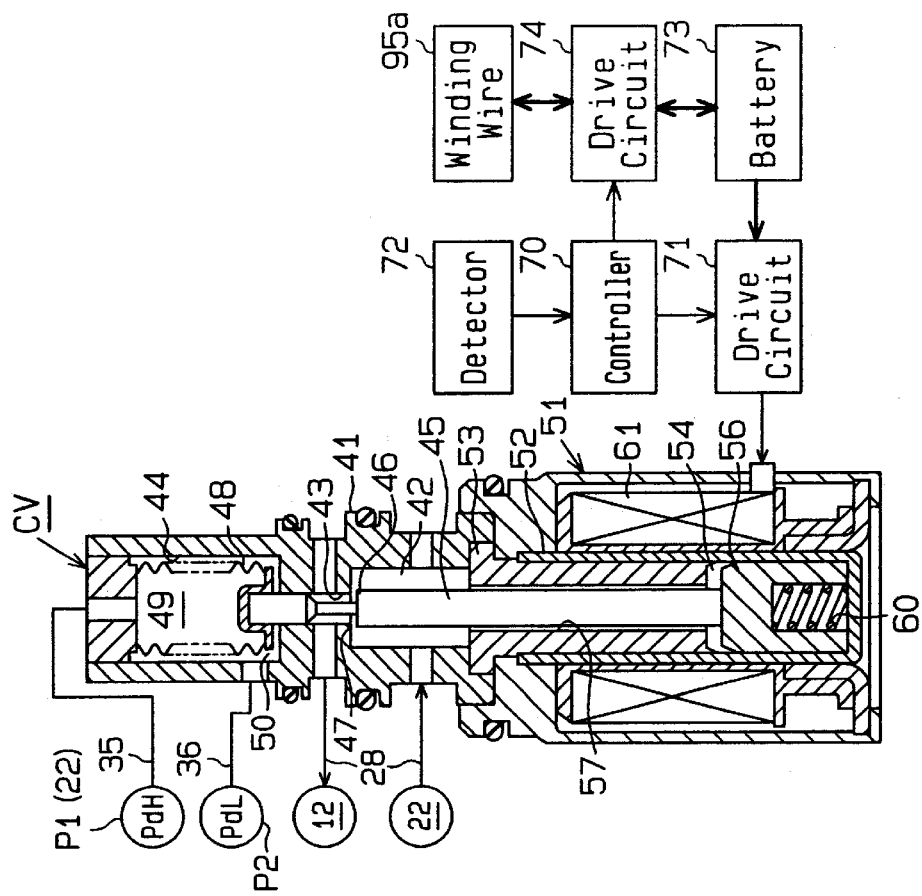
FIG. 4 is a cross-sectional view illustrating a control vale.

As shown in FIG. 4, the control valve CV has a valve housing 41. A valve chamber 42, a communication passage 43, and a pressure sensing chamber 44 are defined in the valve housing 41. A transmission rod 45 extends through the valve chamber 42 and the communication passage 43. The transmission rod 45 moves in the axial direction, or in the vertical direction as viewed in the drawing. The upper portion of the transmission rod 45 is slidably located in the communication passage 43 and the valve chamber 42.

The communication passage 43 is disconnected from the pressure sensing chamber 44 by the upper portion of the transmission rod 45. The valve chamber 42 is connected to the discharge chamber 22 through an upstream section of the supply passage 28. The communication passage 43 is connected to the crank chamber 12 through a downstream section of the supply passage 28. The valve chamber 42 and the communication passage 43 form a part of the supply passage 28.

A cylindrical valve body 46 is formed in the middle portion of the transmission rod 45 and is located in the valve chamber 42. A step defined between the valve chamber 42 and the communication passage 43 functions as a valve seat 47. When the transmission rod 45 is moved from the position of FIG. 4, or the lowermost position, to the uppermost position, at which the valve body 46 contacts the valve seat 47, the communication passage 43 is disconnected from the valve chamber 42. That is, the valve body 46 controls the opening degree of the supply passage 28.

A pressure sensing member 48, which is a bellows in this embodiment, is located in the pressure sensing chamber 44. The upper end of the pressure sensing member 48 is fixed to the valve housing 41. The lower end (movable end) of the pressure sensing member 48 receives the upper end of the transmission rod 45. The pressure sensing member 48 divides the pressure sensing chamber 44 into a first pressure chamber 49, which is the interior of the pressure sensing member 48, and a second pressure chamber 50, which is the exterior of the pressure sensing member 48. The first pressure chamber 49 is connected to the first pressure monitoring point P1 through a first pressure introduction passage 35. The second pressure chamber 50 is connected to the second pressure monitoring point P2 through a second pressure introduction passage 36. Therefore, the first pressure chamber 49 is exposed to the pressure PdH monitored at the first pressure monitoring point P1, and the second pressure chamber 50 is exposed to the pressure PdL monitored at the second pressure monitoring point P2. The pressure sensing member 48 and the pressure sensing chamber 44 form a pressure sensing mechanism.

Target pressure difference changing means, which is an electromagnetic actuator 51 in the preferred embodiment, is located at the lower portion of the valve housing 41. The electromagnetic actuator 51 includes a cup-shaped cylinder 52. The cylinder 52 is located at the axial center of the valve housing 41. A cylindrical center post 53 is fitted in the upper opening of the cylinder 52. The center post 53 defines a plunger chamber 54 at the lowermost portion in the cylinder 52.

A plunger 56 is located in the plunger chamber 54 and slides in the axial direction. An axial guide hole 57 is formed in the center of the center post 53. The lower portion of the transmission rod 45 is slidably supported by the guide hole 57. The lower end of the transmission rod 45 abuts against the upper end surface of the plunger 56 in the plunger chamber 54.

A coil spring 60 is accommodated in the plunger chamber 54 between the inner bottom surface of the cylinder 52 and the plunger 56. The coil spring 60 urges the plunger 56 toward the transmission rod 45. The transmission rod 45 is urged toward the plunger 56 based on the spring characteristics of the pressure sensing member 48 (hereinafter, referred to as a bellows 48). Therefore, the plunger 56 moves integrally with the transmission rod 45 up and down as viewed in the drawing. The force of the bellows 48 is greater than the force of the coil spring 60.

A coil 61 is arranged about the outer wall of the cylinder 52 such that the coil 61 partly covers the center post 53 and the plunger 56. The coil 61 is connected to a drive circuit 71, and the drive circuit 71 is connected to a controller 70. The controller 70 is connected to a detector 72. The controller 70 receives external information (on-off state of the air conditioner, the temperature of the passenger compartment, and a target temperature) from the detector 72. Based on the received information, the controller 70 commands the drive circuit 71 to supply current to the coil 61 from a battery 73.

The electromagnetic force (electromagnetic attracting force) that corresponds to the value of the current from the drive circuit 71 to the coil 61 is generated between the plunger 56 and the center post 53. The electromagnetic force is then transmitted to the transmission rod 45 through the plunger 56. The value of the current supplied to the coil 61 is controlled by controlling the voltage applied to the coil 61. In this embodiment, the applied voltage is controlled by pulse-width modulation (PWM).

The position of the transmission rod 45 (the valve body 46), or the valve opening of the control valve CV, is controlled in the following manner.

As shown in FIG. 4, when the coil 61 is supplied with no electric current (duty ratio=0%), the position of the transmission rod 45 is dominantly determined by the downward force of the bellows 48. Thus, the transmission rod 45 is placed at its lowermost position, and the communication passage 43 is fully opened. Therefore, the pressure in the crank chamber 12 is the maximum value available at that time. The difference between the pressure in the crank chamber 12 and the pressure in the compression chambers 20 thus becomes great. As a result, the inclination angle of the swash plate 15 is minimized, and the discharge displacement of the compressor is also minimized.

When a current of a minimum duty ratio, which is greater than 0%, is supplied to the coil 61 of the control valve CV, the resultant of the upward electromagnetic force and the upward force of the spring 60 surpasses the downward force of the bellows 48, which moves the transmission rod 45 upward. In this state, the resultant of the upward electromagnetic force and the upward force of the spring 60 acts against the resultant of the force based on the pressure difference $\Delta Pd$ ($\Delta Pd=PdH-PdL$) and the downward forces of the bellows 48. The position of the valve body 46 of the transmission rod 45 relative to the valve seat 47 is determined such that upward and downward forces are balanced.

For example, if the flow rate of the refrigerant in the refrigerant circuit is decreased due to a decrease in speed of the engine E, the downward force based on the pressure difference $\Delta Pd$ decreases, and the electromagnetic force cannot balance the forces acting on the transmission rod 45. Therefore, the transmission rod 45 (the valve body 46) moves upward. This decreases the opening degree of the communication passage 43 and thus lowers the pressure in the crank chamber 12. Accordingly, the inclination angle of the swash plate 15 is increased, and the displacement of the compressor is increased. The increase in the displacement of the compressor increases the flow rate of the refrigerant in the refrigerant circuit, which increases the pressure difference $\Delta Pd$.

In contrast, when the flow rate of the refrigerant in the refrigerant circuit is increased due to an increase in the speed of the engine E, the downward force based on the pressure difference $\Delta Pd$ increases and the current electromagnetic force cannot balance the forces acting on the transmission rod 45. Therefore, the transmission rod 45 (the valve body 46) moves downward and increases the opening degree of the communication passage 43. This increases the pressure in the crank chamber 12. Accordingly, the inclination angle of the swash plate 15 is decreased, and the displacement of the compressor is also decreased. The decrease in the displacement of the compressor decreases the flow rate of the refrigerant in the refrigerant circuit, which decreases the pressure difference $\Delta Pd$.

When the duty ratio of the electric current supplied to the coil 61 is increased to increase the electromagnetic force, the pressure difference $\Delta Pd$ cannot balance the forces acting on the transmission rod 45. Therefore, the transmission rod 45 (the valve body 46) moves upward and decreases the opening degree of the communication passage 43. As a result, the displacement of the compressor is increased. Accordingly, the flow rate of the refrigerant in the refrigerant circuit is increased and the pressure difference $\Delta Pd$ is increased.

When the duty ratio of the electric current supplied to the coil 61 is decreased and the electromagnetic force is decreased accordingly, the pressure difference $\Delta Pd$ cannot balance the forces acting on the transmission rod 45. Therefore, the transmission rod 45 (the valve body 46) moves downward, which increases the opening degree of the communication passage 43. Accordingly, the compressor displacement is decreased. As a result, the flow rate of the refrigerant in the refrigerant circuit is decreased, and the pressure difference $\Delta Pd$ is decreased.

As described above, the target value of the pressure difference $\Delta Pd$ is determined by the duty ratio of current supplied to the coil 61. The control valve CV automatically determines the position of the transmission rod 45 (the valve body 46) according to changes of the pressure difference $\Delta Pd$ to maintain the target value of the pressure difference $\Delta Pd$. The target value of the pressure difference $\Delta Pd$ is externally controlled by adjusting the duty ratio of current supplied to the coil 61.

Figure 2:
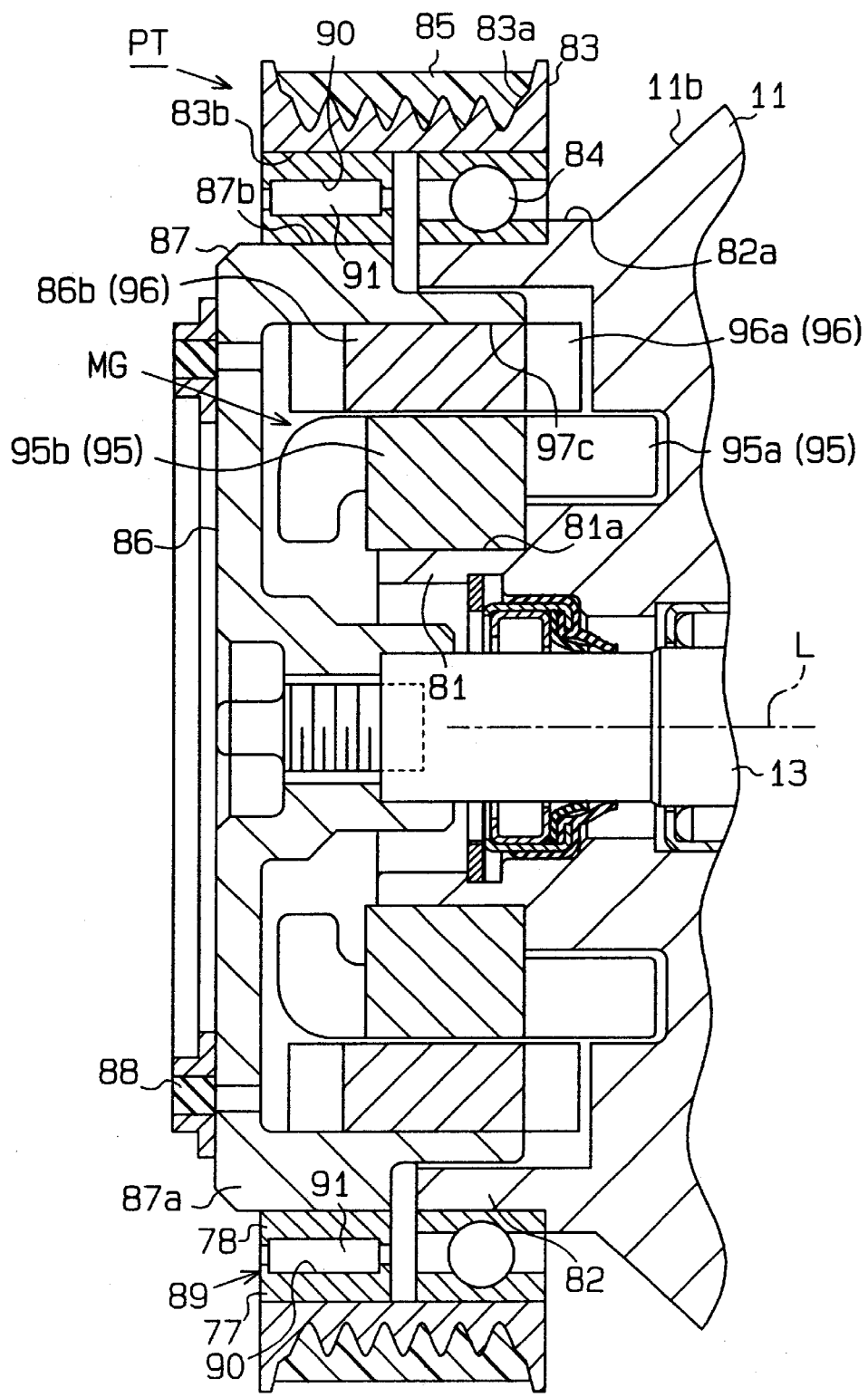
FIG. 2 is an enlarged view illustrating the vicinity of the pulley shown in FIG. 1.

As shown in FIG. 2, a first cylindrical portion 81 extends from the inner circumferential side of the front end surface 1b of the housing 11 such that the first cylindrical portion 81 surrounds the front end portion of the drive shaft 13. A second cylindrical portion 82 extends from the outer circumferential portion of the front end surface 1b of the housing 11 such that the second cylindrical portion 82 is coaxial with the first cylindrical portion 81 and the second cylindrical portion 82 surrounds the first cylindrical portion 81.

A first rotating member, which is a rotor 83 in the preferred embodiment, is rotatably supported by the outer circumferential surface 82a of the second cylindrical portion 82 through a bearing 84. The outer circumferential surface of the rotor 83 functions as a power transmitting portion, which is a belt holder 83a in the preferred embodiment. The belt holder 83a has a saw-tooth cross section. A ribbed belt 85, which is connected to the engine E, is wound about the belt holder 83a.

A hub 86 is secured to the front end portion of the drive shaft 13, which projects from the housing 11. A ring 87 having an L-shaped cross section is arranged at the outer circumferential side of the hub 86. A cylindrical outer circumferential wall 87a of the ring 87 extends toward the rear end of the compressor inside the rotor 83. The distal end of the outer circumferential wall 87a reaches inside the second cylindrical portion 82.

The hub 86 and the ring 87 are operably connected to each other by torque fluctuation reducing means, which is an annular rubber member 88 in the preferred embodiment. The rubber member 88 is arranged to partly cover the hub 86 and the ring 87. The rubber member 88 is elastically deformed to permit the hub 86 and the ring 87 to rotate relative to each other by a certain amount. This disconnects the transmission of excessive torque fluctuations between the hub 86 and the ring 87. The hub 86, the ring 87, and the rubber member 88 form a second rotating member. The first rotating member (rotor 83) and the second rotating member form a pulley, which functions as a rotating body.

A clutch mechanism, which is a one-way clutch 89 in the preferred embodiment, is arranged between the rotor 83 and the ring 87. The one-way clutch 89 is arranged in the rotor 83 and is located in the area inside the belt holder 83a and entirely surrounded by the belt holder 83a.

Figure 3A:
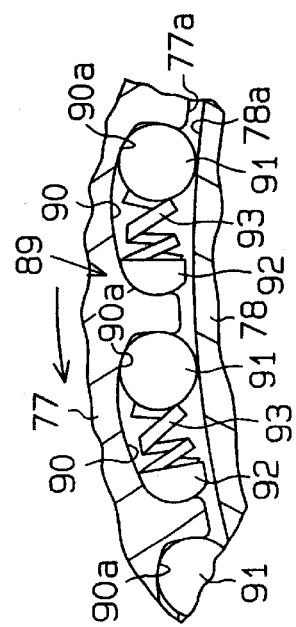
FIG. 3(a) is an enlarged cross-sectional view illustrating a one-way clutch in a state where the power from the engine is transmitted to the shaft via the clutch.
Figure 3B:
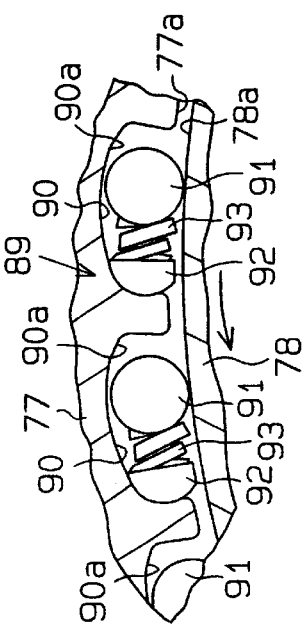
FIG. 3(b) is an enlarged cross-sectional view illustrating the one way clutch in a state where the power transmission is disconnected.

As shown in FIGS. 2, 3(a), and 3(b), an annular outer clutch member 77 is secured to the inner circumferential surface 83b of the rotor 83 in front of the bearing 84 (on the left side as viewed in the drawing). An annular inner clutch member 78 is secured to the outer circumferential surface 87b of the ring 87 (outer circumferential wall 87a) such that the inner clutch member 78 is surrounded by the outer clutch member 77.

Recesses 90 are formed about the axis L of the drive shaft 13 at an equal angular interval on the inner circumferential surface 77a of the outer clutch member 77. A cam surface 90a is formed on the trailing end of each recess 90. A roller 91, which extends parallel with the drive shaft 13, is accommodated in each recess 90. Each roller 91 can be moved from the position where the roller 91 is engaged with the cam surface 90a as shown in FIG. 3(a) to the position where the roller 91 is disengaged from the cam surface 90a as shown in FIG. 3(b).

A spring seat member 92 is provided in each recess 90 on the end portion opposite to the cam surface 90a. A spring 93 is arranged between each spring seat member 92 and the corresponding roller 91. Each spring 93 urges the corresponding roller 91 toward the corresponding cam surface 90a.

As shown in FIG. 3(a), when the rotor 83 is rotated by the power transmission from the engine E in the direction indicated by an arrow, the roller 91 is urged toward the cam surface 90a by the spring 93. Then, the roller 91 is engaged with the cam surface 90a. The ring 87 is rotated in the same direction as the rotor 83 by the friction between the roller 91 and the outer circumferential surface 78a of the inner clutch member 78 and the friction between the roller 91 and the cam surface 90a. That is, when the engine E is running, the power of the engine E is transmitted to the drive shaft 13 through the ring 87, the rubber member 88, and the hub 86. Thus, the drive shaft 13 is always driven when the engine E is running.

As shown in FIG. 3(b), if the ring 87 is rotated in the direction indicated by the arrow when the engine E (or the rotor 83) is stopped, the rotor 83 is assumed to be rotated in the opposite direction relative to the ring 87. Therefore, the roller 91 is disengaged from the cam surface 90a and moves toward the spring seat 92 against the force of the spring 93. Thus, the ring 87 runs idle with respect to the rotor 83. That is, when the motor generator MG functions as a motor and rotates the ring 87 as will be described later, the power transmission between the ring 87 and the rotor 83 is disconnected. Therefore, the power of the motor generator MG is not transmitted to the engine E.

As shown in FIG. 2, the motor generator MG, which is formed of an induction machine, is located in the rotor 83. More specifically, the motor generator MG is arranged in the rotor 83 such that the motor generator MG is arranged in the area inside the belt holder 83a and surrounded by the belt holder 83a.

That is, a stator 95, which includes a winding wire 95a and an iron core 95b, is secured to the outer circumferential surface 81a of the first cylindrical portion 81 inside the belt holder 83a of the rotor 83. Similarly, a rotary element 96, which includes a rotor conductor 96a and a rotor core 96b, is secured to the inner circumferential surface 87c of the outer circumferential wall 87a of the ring 87 such that the rotary element 96 surrounds the periphery of the stator 95.

As shown in FIG. 2, the winding wire 95a of the stator 95 is connected to a battery 73 through a drive circuit 74, which includes, for example, an inverter and a converter. The drive circuit 74 supplies current to the winding wire 95a based on commands from a controller 70.

When the engine E is running, the controller 70 commands the drive circuit 74 to supply current to the winding wire 95a such that the motor generator MG functions as an induction generator. Therefore, when the ring 87 (rotary element 96) is rotated by the power transmission from the engine E, current is generated in the winding wire 95a and stored in the battery 73 through the drive circuit 74.

If the controller 70 determines that the air needs to be cooled based on the information from a detector 72 when the engine E is stopped, the controller 70 commands the drive circuit 74 to supply current to the winding wire 95a such that the motor generator MG functions as an induction motor. Therefore, the rotary element 96 is rotated and the rotation is transmitted to the drive shaft 13 through the ring 87, the rubber member 88, and the hub 86. Therefore, although the engine E is stopped, the compartment temperature can be controlled.

When the engine E is stopped, the controller 70 commands the drive circuit 74 to rotate the motor generator MG (rotary element 96) at a substantially constant speed. As for the fluctuations of the cooling load, the duty ratio for driving the control valve CV (coil 61) is adjusted in the same manner as when the engine E is running.

The above illustrated embodiment has the following advantages.

(1) The motor generator MG is arranged in the rotor 83 such that the motor generator MG is arranged in the area inside the belt holder and surrounded by the belt holder 83a. That is, the space inside the belt holder 83a is effectively used for accommodating the motor generator MG. Therefore, the size of the pulley PT, or the size of the compressor, which has the pulley PT, is reduced in the direction of the axis L of the drive shaft 13. Thus, the pulley PT is easily installed in a vehicle.

(2) At least the main parts of the motor generator MG, or the large parts, which are the stator 95 and the rotary element 96, are arranged inside the belt holder 83a. Therefore, the advantage described in (1) is more effectively provided.

(3) The one-way clutch 89 permits power transmission from the rotor 83 (engine E) to the ring 87 (drive shaft 13) and restricts power transmission from the ring 87 to the rotor 83. Therefore, when the engine E is stopped, the power of the motor generator MG is prevented from being unnecessarily transmitted to the engine E. Thus, excessive power consumption by the motor generator MG is suppressed.

(4) The one-way clutch 89 limits the direction of power transmission by a mechanical structure. Therefore, compared with a case when, for example, an electromagnetic clutch is used as a clutch mechanism and the electromagnetic clutch controls the direction of power transmission (this does not deviate from the concept of the present invention), the electric configuration of the pulley PT is simplified and the computing load of the controller 70 for controlling the electric configuration is reduced.

(5) The one-way clutch 89 is arranged in the rotor 83 such that the one-way clutch 89 is arranged in the area inside the belt holder 83a and surrounded by the belt holder 83a. Therefore, the advantage described in (1) is more effectively provided. The size of the one-way clutch 89 is less than the size of, for example, the electromagnetic clutch. Also, an electric wiring for connecting the clutch to an external device is not required. Therefore, the one-way clutch 89 is entirely accommodated in the area inside the belt holder 83a easily.

(6) The hub 86 is connected to the ring 87 by the rubber member 88, which reduces the transmission of torque fluctuations between the hub 86 and the ring 87. Therefore, for example, the excessive fluctuations of the load torque of the compressor connected to the hub 86 is prevented from being transmitted to the engine E, or the motor generator MG, connected to the ring 87 (when the engine is stopped). Therefore, the engine E or the motor generator MG is operated in a stable manner. The rotary element 96 of the motor generator MG also contributes to reducing the torque fluctuations.

(7) The control valve CV does not directly use the suction pressure, which is affected by the value of thermal load on the evaporator 33, as an index for controlling the opening degree of the valve in the similar manner as the control valve of a target suction pressure variable type control valve. The displacement of the compressor is feedback controlled based on the pressure difference ΔPd between the two pressure monitoring points P1, P2 in the refrigerant circuit. Thus, compared with, for example, the target suction pressure variable type control valve, the compressor displacement is quickly and reliably controlled based on the fluctuation of the engine speed and by the controller 70 without being influenced by the thermal load on the evaporator 33. Particularly, when the engine speed increases, the compressor displacement is quickly decreased, which improves the fuel economy.

It should be apparent to those skilled in the art that the present invention may be embodied in many other specific forms without departing from the spirit or scope of the invention. Particularly, it should be understood that the invention may be embodied in the following forms.

In the motor generator MG according to the preferred embodiment, the rotary element 96 is arranged outside the stator 95. This is called an outer rotor type. The motor generator MG may be changed to an inner rotor type. That is, as shown in FIG. 5, the stator 95 is secured to the inner circumferential surface of the second cylindrical portion 82 and the rotary element 96 is secured to the inner circumferential portion of the hub 86 such that the rotary element 96 is arranged inside the stator 95.

A torque limiter (disconnecting means) may be arranged between the hub 86 and the ring 87 to disconnect to prevent the transmission of excessive torque between the hub 86 and the ring 87.

That is, for example, as shown in FIGS. 6(a), 6(b), and 6(c), the rubber member 88 may be omitted. In this case, a rubber member 98, which is annular about the axis L, is secured to the inner circumferential side of the ring 87 instead of the rubber member 88. The rubber member 98 includes projections 98a (only one is shown), which extend toward the hub 86 at an equal angular interval about the axis L. The hub 86 includes recesses 99 (only one is shown) on its outer circumferential portion at an equal angular interval about the axis L. Each of the projection 98a of the rubber member 98 is fitted to one of the recesses 99. Power is transmitted between the hub 86 and the ring 87 by the engagement of the projections 98a and the recesses 99.

The elastic force of the rubber member 98 (projections 98a) is not sufficient for maintaining the engagement between the projection 98a and the recesses 99 when a malfunction occurs in the driven apparatus, for example, when the apparatus is locked, and the excessive torque above an upper limit level is generated. Therefore, as shown in FIGS. 6(b) and 6(c), the projections 98a are elastically deformed and disengaged from the recesses 99. Thus, the hub 86 and the ring 87 are disconnected, which disconnects the power transmission between the hub 86 and the ring 87. As a result, the engine E connected to the ring 87 is prevented from being affected by an excessive load torque of the compressor connected to the hub 86.

The hub 86 and the ring 87 rotate relative to each other by a certain amount while maintaining the power transmission. The power transmission is maintained by the elastic deformation of the projections 98a in the range that the projections 98a are not disengaged from the recesses 99. Therefore, the transmission of excessive torque fluctuations between the hub 86 and the ring 87 is disconnected by the rubber member 98. That is, the rubber member 98 also functions as the torque fluctuation reducing means.

A sprocket and gear may be used as a rotating body instead of the pulley. That is, the present invention is applied to a rotating apparatus, which transmits power between the engine E and the compressor through a chain or a gear mechanism.

The rotating apparatus of the present invention may be embodied in a wobble type variable displacement compressor.

The rotating apparatus of the present invention may be embodied in a scroll type rotary compressor.

The rotating apparatus of the present invention may be embodied in a fixed displacement compressor.

The first pressure monitoring point P1 may be located in a suction pressure zone, which includes the evaporator 33 and the suction chamber 21. In this case, the second pressure monitoring point P2 is located downstream of the first pressure monitoring point P1 within the suction pressure zone.

The first pressure monitoring point P1 may be located in a discharge pressure zone, which includes the discharge chamber 22 and the condenser 31. In this case, the second pressure monitoring point P2 is located in the suction pressure zone.

The first pressure monitoring point P1 may be located in the discharge pressure zone. In this case, the second pressure monitoring point P2 is located in the crank chamber 12. The second pressure monitoring point P2 may be located in the crank chamber 12. In this case, the first pressure monitoring point P1 is located in the suction pressure zone.

The locations of the pressure monitoring points P1 and P2 are not limited to the main circuit of the refrigerant circuit, which includes the external refrigerant circuit 30 (evaporator 33), the suction chamber 21, the compression chamber 20, the discharge chamber 22, and external refrigerant circuit 30 (the condenser 31). That is, the pressure monitoring points P1 and P2 need not be in a high pressure zone or a low pressure zone of the refrigerant circuit. For example, the pressure monitoring points P1, P2 may be located in the crank chamber 12, which is an intermediate pressure zone of a refrigerant passage for controlling the compressor displacement. The displacement controlling passage is a sub-circuit of the refrigerant circuit, and includes the supply passage 28, the crank chamber 12, and the bleed passage 27.

A target suction pressure variable type control valve or target discharge pressure variable type control valve may be used as the control valve CV. The target suction pressure variable type control valve includes a pressure sensing mechanism and a target suction pressure changing means. The pressure sensing mechanism mechanically detects the suction pressure and moves the valve body to change the displacement of the variable displacement compressor in a direction to cancel the fluctuations of the detected suction pressure. The target suction pressure changing means controls the force applied to the valve body by an external command and changes the target suction pressure, which is a reference value for determining the position of the valve body by the pressure sensing mechanism. The target discharge pressure variable type control valve is applied in the same manner as the target suction pressure variable type control valve.

The rotary electric device may be structured to function only as a motor or a generator.

The rotating apparatus of the present invention may be applied to a fluid machine other than a compressor of a vehicular air conditioner. For example, the rotating apparatus of the present invention may be applied to a hydraulic pump for a brake assisting apparatus of a vehicle, a hydraulic pump for a power steering apparatus, and an air pump for an air suspension apparatus.

Therefore, the present examples and embodiments are to be considered as illustrative and not restrictive and the invention is not to be limited to the details given herein, but may be modified within the scope and equivalence of the appended claims.

What is claimed is:

1. A rotating apparatus comprising:
   a rotating body, wherein the rotating body includes a power transmitting portion on its outer circumferential surface, and wherein the power transmitting portion transmits power between an external drive source and the rotating body; and
   a rotary electric device, which is accommodated in and operably connected to the rotating body, wherein the rotary electric device alternately functions as a motor or a generator,
   wherein the rotary electric device is arranged inside the power transmitting portion such that the rotary electric device is surrounded by the power transmitting portion.

2. The rotating apparatus according to claim 1, wherein the rotating body is a pulley and the power transmitting portion of the rotating body is a belt holder about which a belt, which is connected to the external drive source, is wound.

3. The rotating apparatus according to claim 1, wherein substantially the entire outer circumferential surface of the rotating body forms the power transmitting portion.

4. The rotating apparatus according to claim 1, wherein the rotary electric device includes a stator and a rotary element, and the stator and the rotary element are arranged inside the power transmitting portion.

5. The rotating apparatus according to claim 1, wherein the rotating body is installed in a fluid machine, wherein the fluid machine includes a housing and a drive shaft,
   wherein the rotating body and the rotary electric device are supported by the housing of the fluid machine and operably connected to the drive shaft of the fluid machine, and wherein the power transmitting portion transmits power between the drive shaft of the fluid machine and the external drive source.

6. The rotating apparatus according to claim 5, wherein the external drive source is a drive source of a vehicle, and wherein, when the drive source is stopped, the rotary electric device functions as a motor and drives the drive shaft of the fluid machine.

7. The rotating apparatus according to claim 5, wherein the external drive source is a drive source of a vehicle, and wherein, when the drive source is running, the rotary electric device functions as a generator.

8. The rotating apparatus according to claim 5, wherein the fluid machine is a compressor, which forms a part of a refrigerant circuit of an air conditioner.

9. The rotating apparatus according to claim 8, wherein the compressor includes a control chamber and a control valve, which adjusts the pressure in the control chamber, and wherein the displacement of the compressor is controlled by adjusting the pressure in the control chamber,
   wherein the control valve includes a valve body and a pressure sensing mechanism, wherein the pressure sensing mechanism detects the pressure difference between two pressure monitoring points located in a refrigerant passage of the refrigerant circuit, and moves the valve body to change the displacement of the compressor to cancel the fluctuations of the detected pressure difference.

10. The rotating apparatus according to claim 1, wherein the rotating body includes a pulley, which includes the power transmitting portion, and a ring, which is connected to the rotary electric device and rotates integrally with the rotary electric device, and wherein a clutch mechanism, which connects and disconnects the pulley and the ring, is located between the pulley and the ring.

11. The rotating apparatus according to claim 10, wherein the clutch mechanism is a one-way clutch, which permits the power transmission from the pulley to the ring, and selectively disconnects the power transmission from the ring to the pulley.

12. The rotating apparatus according to claim 10, wherein the clutch mechanism is arranged inside the power transmitting portion such that the clutch mechanism is surrounded by the power transmitting portion.

13. The rotating apparatus according to claim 10, wherein the ring includes reducing means in a power transmitting path to reduce the fluctuations of the transmitted torque.

14. The rotating apparatus according to claim 10, wherein the ring includes disconnecting means in the power transmitting path to disconnect to prevent the transmission of the excessive torque.

15. The rotating apparatus according to claim 8, wherein the compressor is a variable displacement compressor.

16. The rotating apparatus according to claim 9, wherein the two pressure monitoring points are located in a discharge pressure zone in the refrigerant circuit.

17. The rotating apparatus according to claim 1, wherein the rotary electric device has a rotation axis and the rotating body has a rotation axis that is coaxial with the rotation axis of the rotary electric device.

18. A compressor, which includes a drive shaft and a compression mechanism in a housing, and wherein the drive shaft is rotated by an external drive source, and the compression mechanism draws in, compresses, and discharges fluid in accordance with the rotation of the drive shaft, the compressor comprising:

a rotating body, wherein the rotating body includes a power transmitting portion on its outer circumferential surface, and wherein the power transmitting portion transmits power between the external drive source and the rotating body; and a rotary electric device, which is accommodated in and operably connected to the rotating body, wherein the rotary electric device alternately functions as a motor or a generator, wherein the rotary electric device is arranged inside the power transmitting portion such that the rotary electric device is surrounded by the power transmitting portion.

19. The compressor according to claim 18, wherein the rotating body is a pulley and the power transmitting portion of the rotating body is a belt holder about which a belt, which is connected to the external drive source, is wound.

20. The compressor according to claim 18, wherein substantially the entire outer circumferential surface of the rotating body forms the power transmitting portion.

21. The rotating apparatus according to claim 18, wherein the rotary electric device includes a stator and a rotary element, and the stator and the rotary element are arranged inside the power transmitting portion.

22. The rotating apparatus according to claim 18, wherein the external drive source is a drive source of a vehicle, and wherein, when the drive source is stopped, the rotary electric device functions as a motor and drives the drive shaft of the fluid machine.

23. The rotating apparatus according to claim 18, wherein the rotary electric device has a rotation axis and the rotating body has a rotation axis that is coaxial with the rotation axis of the rotary electric device.

* * * * *

UNITED STATES PATENT AND TRADEMARK OFFICE
CERTIFICATE OF CORRECTION

PATENT NO. : 6,719,538 B2
DATED : April 13, 2004
INVENTOR(S) : Masaki Ota et al.

It is certified that error appears in the above-identified patent and that said Letters Patent is hereby corrected as shown below:

<u>Column 6,</u>
Lines 38 and 41, please delete "1*b*" and insert therefore -- 11*b* --

Signed and Sealed this

Thirteenth Day of July, 2004

JON W. DUDAS
*Acting Director of the United States Patent and Trademark Office*